Oct. 16, 1928.
C. A. UPSON
1,687,599
FIBER BOARD AND METHOD OF MAKING SAME
Filed Oct. 4, 1922
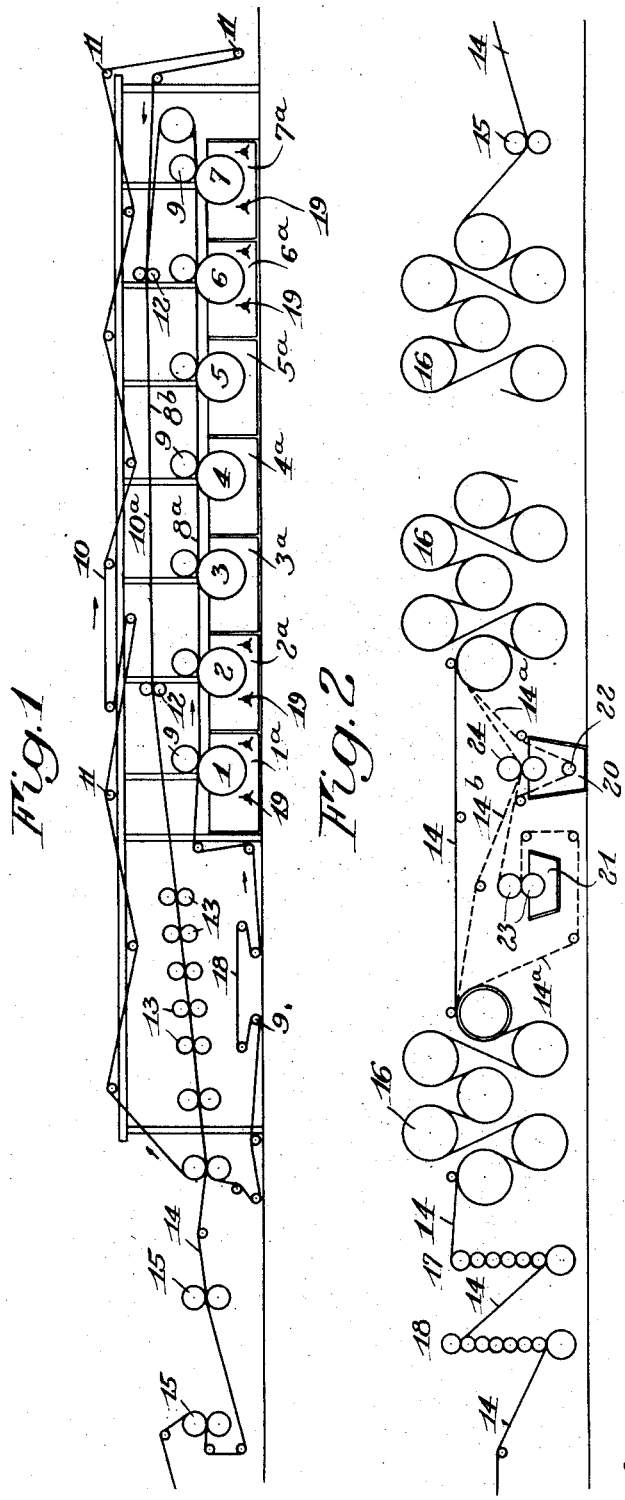
INVENTOR.
Charles A. Upson
BY
his ATTORNEY Patented Oct. 16, 1928.

1,687,599

UNITED STATES PATENT OFFICE.

CHARLES A. UPSON, OF LOCKPORT, NEW YORK, ASSIGNOR OF ONE-HALF TO W. HARRISON UPSON, OF LOCKPORT, NEW YORK.

FIBER BOARD AND METHOD OF MAKING SAME.

Application filed October 4, 1922. Serial No. 592,424.

My present invention relates to paper making and more particularly to the manufacture of paper sheets of the kind used as units in building laminated structures commonly known as fiber board or wall board which is a relatively heavy paper product used in the place of light lumber and to a large extent for building purposes. The invention has for its object to provide an improved article of this character that will be semi-noninflammable or of a fire-resisting nature, the improvements being directed toward the method of manufacturing such an article as well as to the article itself. To these and other ends the invention consists in certain improvements and combinations of parts, all as will be hereinafter more fully described, the novel features being pointed out in the claims at the end of the specification.

In the drawings:

Figure 1 is a diagrammatic side elevation of the wet end of a cylinder type paper making machine of a character suitable for carrying out the process and producing the article of my invention.

Figure 2 is a similar view of the dry end of the same machine, said figure being a continuation of the showing of Figure 1 and Figure 3 is a fragmentary edge view of a fiber board constructed in accordance with and illustrating one embodiment of my invention.

Similar reference numerals throughout the several views indicate the same parts.

My invention contemplates the production of a homogeneous fiber sheet, the tensile and breaking strength of which is contributed by a body of vegetable or similar strong fibers and the fire-resisting qualities of which are contributed by the incorporation therein of a quantity of non-combustible mineral fibers. The former may be wood pulp as in the ordinary wall board and the latter are preferably asbestos. Various combinations of these layers or superposed bodies thus constituted may be employed to form a laminated fiber board of the nature of wall board and I make no attempt herein to define or differentiate between the combinations that may be most effective for particular uses as my invention relates, fundamentally merely to the problem of uniting or joining together in an integral mass two adjoining bodies or layers, one composed of fibers of the one kind and the other composed of fibers of the other kind. A typical structure, however, may be stated to be one in which a layer or lining of inflammable vegetable fiber is confined in my improved manner between two outer layers or facings of noncombustible asbestos or other mineral fiber in which case the central layer is protected from high degrees of heat by the outer layers but, if once consumed by fire, leaves an ashy body that is itself a nonconductor of further heat attacks.

In the present application I describe, as an embodiment of my invention, a preferred modification of the structure last alluded to in which a board of the same general nature with outer bodies of asbestos and an inner body of vegetable fiber is built up of a plurality of layers of each instead of only three.

I am aware that composite boards of the same general nature to the extent that they embody facings of asbestos have been heretofore made but in most cases they are constructed by cementing or similarly joining separately formed layers or sheets of asbestos to a central body of vegetable or other fibers so that a strictly laminated structure is produced. As is well known, asbestos, particularly when manufactured into sheets, is flimsy and has little tensile strength. Great difficulty is therefore experienced in handling it and it cannot be safely manipulated in large sheets for rapid quantity production because of this inherent weakness. It is also difficult, as a commercial proposition, to get it to adhere uniformly to the base material, to which it is applied.

In the practice of my present invention I do not depend exclusively if at all upon the use of cements or adhesives in obtaining the bond between the abestos or mineral and the paper or vegetable fibers of the board but bring them together in such a condition and in such a manner that the fibers of one are felted and interlaced with those of the other so that an integral body results instead of one in which the respective layers are definitely separated by lines or planes of adhesive contact. This is done by simultaneously forming a film or web of paper pulp and a film or web of asbestos pulp and then, while the webs are saturated and the fibers still sufficiently wet for relative movement, bringing the webs forcibly into contact with each other so that the respective surface fibers intermix and interlace between the two bodies of material and become parts of one and the same structure.

To effect these ends I may employ an ordinary paper making machine of the kind used in the manufacture of fiber board of the character used for the laminations of built up wall board and I have shown such a machine, with certain modifications in the accompanying drawings. I will combine a further explanation of my invention with a description of such a machine.

As before indicated, the present machine is of the cylinder type employing seven cylinders 1,2,3,4,5,6,7, turning in individual tanks or vats $1^a$, $2^a$, $3^a$, $4^a$, $5^a$, $6^a$, $7^a$, and adapted to form a seven ply product, that is seven webs or pulp sheets that are ultimately combined together to produce a fiber board of substantial thickness. A lower felt or continuous apron 8 traveling in the direction of the arrows over suitable guides 9 has a lower reach $8^a$ that rides on top of the cylinders, successively, to pick up the web or film of paper pulp from each and build the final multiple web sheet in the ordinary way, tangential contact being maintained in each instance by the rollers 9. The sheet thus built up is then carried upwardly and backward in a reverse direction on an upper reach $8^b$ of the felt 8 and between the latter and the lower reach $10^a$ of an upper felt or apron 10 traveling in the direction indicated by the arrows over suitable guides 11, further guide rolls 12 being provided for supporting the superposed reaches of the two felts with the sheet between them. The saturated pulp sheet drains itself to some extent during this travel but is further preliminarily squeezed while still held between the felts by a series of baby rolls 13. The product sheet finally emerges under its own tension at 14 from whence it is successively passed through rolls 15 to a battery of driers 16 and finally through calendar stacks 17 and 18 that give it the final surface finish and further condense its structure. Beyond the calendar stacks it is a finished product so far as the paper making machine is concerned.

The pulp, suspended in a large volume of water may be piped into the respective tanks $1^a$ etc. from the pulp chests after being prepared in the usual manner and in the practice of my invention I supply the pairs of end vats $1^a$, $2^a$ and $6^a$, $7^a$ with asbestos or mineral pulp and because of the difficulty of holding or maintaining these heavy fibers suspended in the water I fit these particular tanks with suitable agitators 19 which prevent the fibers from settling at the bottom and keep them circulating to be readily picked up by the wire covered cylinders. In the intermediate tanks $3^a$, $4^a$, $5^a$ I feed wood or other desired vegetable fibers. It will be seen from this that the first or outer filmy web of pulp that is picked up will be asbestos as will the next. The following three will be vegetable fiber and the final two constituting the other outer surface of the product sheet will be asbestos again. In this way a board of the nature shown in Figure 3 will be produced as a homogeneous product, the respective components being designated $1^b$, $2^b$, $3^b$, $4^b$, $5^b$, $6^b$, $7^b$.

I do not, however, wish to designate these various bodies as "layers" because in no way are they superposed sheets in the accepted sense of the word. As will be observed, they are brought together, fresh from the cylinders in a highly saturated state with the result that the fibers deposited by one cylinder interlace immediately with those deposited by the next in such an intimate relationship that the resulting body is really homogeneous and not laminated and a complete contacting surface mixture is established between the two that is no different from the mixing of one fiber with another in each of the individual films. This action occurs on the felt 8 and even before the wet, built up sheet has been carried and drained between the two felts but obviously the interlacing is enhanced by the latter treatment as it is by the press rolls 13 and 15.

With this process the asbestos or other fire-resisting material is formed and attached to its supporting body of strong vegetable or similar fiber in a continuous operation not requiring at any point that the asbestos be individually handled or conducted by itself in a manner in which it is in any way dependent upon its own strength to resist breaking, tearing, splitting, warping or pulling. From the first, it is either on the felt in a saturated state in which no fiber possesses any strength or resistance or else is incorporated with the vegetable fiber and supported and strengthened thereby.

Instead of feeding pure asbestos fiber to the end tanks and cylinders I may mix a quantity of vegetable or other strengthening fibers, that bind and interlace more readily with the asbestos adding none or a small proportion only to the tanks $1^a$ and $7^a$ and progressively more to the succeeding layers or coatings. In this way the finished product may grade down in the one structure gradually from a pure asbestos surface to a pure vegetable inner body or filler.

There are other modifications and accompanying treatments that may form part of the process. For instance cements or binders may be mixed with the asbestos or other fibers in the beaters or chests or added at different points in the formation of the web or sizings may be added at different points either to improve the character of the body of asbestos or the bonding of its fibers with those of the other material. Silicate of soda has a desirable bonding effect and also seems to produce a chemical reaction in the presence of the asbestos that creates an insoluble silicate that improves the water resisting properties of the asbestos. At 20 and 21 in Figure 2 I have illustrated at an intermediate point in the drying stack or battery immersion and coating tanks for treatments of this kind. As shown by the dotted line 14ª the web may pass around suitable rollers 22 through the tank 20 and then between the squeeze rolls 23 above the tank 21 and thence back to the dryers of 1, for coating purposes merely, it may pass as indicated by the dotted line 14ᵇ between pick up rolls 24 running in the tank 20 and to the dryers without actual immersion.

But it will be understood that the main point of my process has reference to the manner in which the saturated webs of the two substances, the one strong and the other weak, are simultaneously formed and then immediately brought together in the wet state to effect a thorough interlacing of the fibers of one with those of the other to form a homogenous product and without resorting to independent handling of an asbestos web or sheet except for a brief period in the immediate region of the producing cylinder in which it may properly be regarded as not yet being in reality a completed body at all.

I claim as my invention:

1. A method of making a fire resisting fiber sheet which embodies simultaneously forming a saturated web of vegetable fiber pulp possessing a relatively high degree of tensile strength and a similar saturated web of mineral fiber pulp of low tensile strength, and then immediately bringing the surface of one web against that of the other to felt and interlace the fibers of both.

2. A method of making a fire resisting fiber sheet which embodies simultaneously forming a saturated web of fiber pulp possessing a relatively high degree of tensile strength and a similar saturated web or mineral fiber pulp of low tensile strength, immediately superposing the webs while wet, one upon the other to cause the fibers of both to felt and interlace with each other and then subjecting the sheet thus built up to pressure to further the felting action and express moisture.

3. A fire resisting fiber sheet embodying intimately related adjacent bodies of fibers the one being composed of vegetable matter possessing a relatively high degree of tensile strength and the other being composed of a mineral possessing relatively low tensile strength but also fire resisting properties, the contiguous fibers of one body being thoroughly interlaced or felted with those of the other body.

CHARLES A. UPSON.